United States Patent
Garnier et al.

(10) Patent No.: US 9,275,762 B2
(45) Date of Patent: Mar. 1, 2016

(54) CLADDING MATERIAL, TUBE INCLUDING SUCH CLADDING MATERIAL AND METHODS OF FORMING THE SAME

(75) Inventors: John E. Garnier, Idaho Falls, ID (US); George W. Griffith, Idaho Falls, ID (US)

(73) Assignee: ADVANCED CERAMIC FIBERS, LLC, Idaho Falls, ID (US)

( * ) Notice: Subject to any disclaimer, the term of this patent is extended or adjusted under 35 U.S.C. 154(b) by 1064 days.

(21) Appl. No.: 12/901,326

(22) Filed: Oct. 8, 2010

(65) Prior Publication Data

US 2012/0087457 A1  Apr. 12, 2012

(51) Int. Cl.
*G21C 3/00* (2006.01)
*G21C 3/07* (2006.01)
(Continued)

(52) U.S. Cl.
CPC ............... *G21C 3/07* (2013.01); *C04B 35/565* (2013.01); *C04B 35/571* (2013.01); *C04B 35/573* (2013.01); *C04B 35/62863* (2013.01); *C04B 35/806* (2013.01); *C04B 37/021* (2013.01); *C04B 37/025* (2013.01); *F16L 9/10* (2013.01); *F16L 9/14* (2013.01); *F16L 58/14* (2013.01); *F22B 37/002* (2013.01); *C04B 2235/3251* (2013.01); *C04B 2235/3258* (2013.01); *C04B 2235/3409* (2013.01); *C04B 2235/3427* (2013.01); *C04B 2235/383* (2013.01);
(Continued)

(58) Field of Classification Search
CPC .............. G21C 3/00; G21C 3/02; G21C 3/04; G21C 3/06; G21C 3/07
USPC ............................ 376/409, 412, 414, 416, 417
See application file for complete search history.

(56) References Cited

U.S. PATENT DOCUMENTS

| | | | |
|---|---|---|---|
| 2,784,112 A | 3/1957 | Nicholson | |
| 3,028,256 A | 4/1962 | Simnad | |

(Continued)

FOREIGN PATENT DOCUMENTS

| | | |
|---|---|---|
| CN | 2700346 Y | 5/2005 |
| EP | 603888 | 6/1994 |

(Continued)

OTHER PUBLICATIONS

Ryan et al., "The Conversion of Cubid to Hexagonal Silicon Carbide as a Function of Temperature and Pressure" USAF, 1967.

(Continued)

*Primary Examiner* — Marshall O'Connor
(74) *Attorney, Agent, or Firm* — Workman Nydegger (57) ABSTRACT

A multi-layered cladding material including a ceramic matrix composite and a metallic material, and a tube formed from the cladding material. The metallic material forms an inner liner of the tube and enables hermetic sealing of thereof. The metallic material at ends of the tube may be exposed and have an increased thickness enabling end cap welding. The metallic material may, optionally, be formed to infiltrate voids in the ceramic matrix composite, the ceramic matrix composite encapsulated by the metallic material. The ceramic matrix composite includes a fiber reinforcement and provides increased mechanical strength, stiffness, thermal shock resistance and high temperature load capacity to the metallic material of the inner liner. The tube may be used as a containment vessel for nuclear fuel used in a nuclear power plant or other reactor. Methods for forming the tube comprising the ceramic matrix composite and the metallic material are also disclosed.

18 Claims, 3 Drawing Sheets

(51) Int. Cl.

| | |
|---|---|
| *C04B 35/565* | (2006.01) |
| *C04B 35/571* | (2006.01) |
| *C04B 35/573* | (2006.01) |
| *C04B 35/628* | (2006.01) |
| *C04B 35/80* | (2006.01) |
| *C04B 37/02* | (2006.01) |
| *F16L 9/10* | (2006.01) |
| *F16L 9/14* | (2006.01) |
| *F16L 58/14* | (2006.01) |
| *F22B 37/00* | (2006.01) |
| *F22B 37/06* | (2006.01) |
| *G21C 13/028* | (2006.01) |

(52) U.S. Cl.
CPC . *C04B2235/3821* (2013.01); *C04B 2235/3826* (2013.01); *C04B 2235/3834* (2013.01); *C04B 2235/3839* (2013.01); *C04B 2235/3843* (2013.01); *C04B 2235/3847* (2013.01); *C04B 2235/3891* (2013.01); *C04B 2235/428* (2013.01); *C04B 2235/524* (2013.01); *C04B 2235/5228* (2013.01); *C04B 2235/5244* (2013.01); *C04B 2235/5248* (2013.01); *C04B 2235/5252* (2013.01); *C04B 2235/5256* (2013.01); *C04B 2235/5268* (2013.01); *C04B 2235/616* (2013.01); *C04B 2235/9607* (2013.01); *C04B 2235/9684* (2013.01); *C04B 2237/062* (2013.01); *C04B 2237/08* (2013.01); *C04B 2237/365* (2013.01); *C04B 2237/38* (2013.01); *C04B 2237/40* (2013.01); *C04B 2237/403* (2013.01); *C04B 2237/405* (2013.01); *C04B 2237/406* (2013.01); *C04B 2237/60* (2013.01); *C04B 2237/62* (2013.01); *C04B 2237/704* (2013.01); *C04B 2237/706* (2013.01); *C04B 2237/708* (2013.01); *C04B 2237/84* (2013.01); *F22B 37/06* (2013.01); *F23M 2900/05004* (2013.01); *G21C 13/028* (2013.01); *Y02E 30/40* (2013.01)

(56) References Cited

U.S. PATENT DOCUMENTS

| | | | |
|---|---|---|---|
| 3,166,614 A | 1/1965 | Taylor | |
| 3,369,920 A | 2/1968 | Bourdeau et al. | |
| 3,386,840 A | 6/1968 | Gruber | |
| 3,427,222 A * | 2/1969 | Biancheria et al. | 376/419 |
| 3,519,472 A | 7/1970 | Evans | |
| 3,535,080 A | 10/1970 | Van Der Pyl | |
| 3,725,533 A | 4/1973 | Economy et al. | |
| 3,808,087 A | 4/1974 | Shyne | |
| 3,813,340 A | 5/1974 | Knippenberg | |
| 3,825,469 A | 7/1974 | Economy et al. | |
| 3,925,151 A | 12/1975 | Klepfer | |
| 4,013,503 A | 3/1977 | Knippenberg | |
| 4,022,662 A | 5/1977 | Gordon et al. | |
| 4,209,334 A * | 6/1980 | Panzera | 501/32 |
| 4,225,355 A | 9/1980 | Galasso et al. | |
| 4,284,612 A | 8/1981 | Horne, Jr. et al. | |
| 4,406,012 A | 9/1983 | Gordon et al. | |
| 4,445,942 A | 5/1984 | Cheng et al. | |
| 4,473,410 A | 9/1984 | Grubb et al. | |
| 4,566,700 A | 1/1986 | Shiembob | |
| 4,707,330 A | 11/1987 | Ferrari | |
| 4,756,895 A | 7/1988 | Boecker | |
| 4,859,503 A | 8/1989 | Bouix et al. | |
| 4,864,186 A | 9/1989 | Milewski et al. | |
| 4,894,203 A | 1/1990 | Adamson | |
| 4,908,340 A | 3/1990 | Frechette | |
| 4,921,725 A | 5/1990 | Bouix et al. | |
| 4,948,763 A | 8/1990 | Hayashida | |
| 4,971,673 A | 11/1990 | Weisweiler et al. | |
| 5,063,107 A | 11/1991 | Birchall | |
| 5,067,999 A | 11/1991 | Streckert et al. | |
| 5,116,679 A | 5/1992 | Nadkarni et al. | |
| 5,135,895 A | 8/1992 | Frechette | |
| 5,182,077 A | 1/1993 | Feinroth | |
| 5,190,737 A | 3/1993 | Weimer et al. | |
| 5,230,848 A | 7/1993 | Wallace et al. | |
| 5,238,711 A | 8/1993 | Barron et al. | |
| 5,268,946 A * | 12/1993 | Bryan et al. | 376/414 |
| 5,304,397 A | 4/1994 | Holzl et al. | |
| 5,330,838 A | 7/1994 | Dyer et al. | |
| 5,340,417 A | 8/1994 | Weimer et al. | |
| 5,354,527 A | 10/1994 | Frechette et al. | |
| 5,364,660 A | 11/1994 | Gabor et al. | |
| 5,366,943 A | 11/1994 | Lipowitz et al. | |
| 5,368,938 A | 11/1994 | Holzl et al. | |
| 5,383,228 A | 1/1995 | Armijo et al. | |
| 5,404,836 A | 4/1995 | Milewski | |
| 5,434,897 A | 7/1995 | Davies | |
| 5,436,042 A | 7/1995 | Lau et al. | |
| 5,449,421 A | 9/1995 | Hamajima et al. | |
| 5,460,637 A | 10/1995 | Connolly et al. | |
| 5,547,512 A | 8/1996 | Gabor et al. | |
| 5,618,510 A | 4/1997 | Okada et al. | |
| 5,676,918 A | 10/1997 | Okada et al. | |
| 5,814,840 A | 9/1998 | Woodall | |
| 5,922,300 A | 7/1999 | Nakajima et al. | |
| 6,022,515 A | 2/2000 | Stole et al. | |
| 6,030,698 A | 2/2000 | Burchell et al. | |
| 6,110,279 A | 8/2000 | Kito et al. | |
| 6,113,982 A | 9/2000 | Claar et al. | |
| 6,261,509 B1 | 7/2001 | Barnard et al. | |
| 6,316,051 B2 | 11/2001 | Okada | |
| 7,041,266 B1 | 5/2006 | Angier et al. | |
| 7,083,771 B2 | 8/2006 | Angier et al. | |
| 7,125,514 B2 | 10/2006 | Okamura et al. | |
| 7,687,016 B1 | 3/2010 | DiCarlo et al. | |
| 7,700,202 B2 | 4/2010 | Easler et al. | |
| 8,940,391 B2 | 1/2015 | Garnier et al. | |
| 2002/0033545 A1 | 3/2002 | Marlowe | |
| 2002/0058107 A1 | 5/2002 | Fareed et al. | |
| 2006/0039524 A1* | 2/2006 | Feinroth et al. | 376/409 |
| 2006/0227924 A1 | 10/2006 | Hallstadius et al. | |
| 2007/0064861 A1* | 3/2007 | Sterbentz | 376/409 |
| 2009/0032178 A1 | 2/2009 | Feinroth | |
| 2009/0318280 A1 | 12/2009 | Mohammadi et al. | |
| 2010/0120604 A1 | 5/2010 | Easler et al. | |
| 2012/0088088 A1 | 4/2012 | Garnier | |
| 2013/0048903 A1 | 2/2013 | Garnier et al. | |

FOREIGN PATENT DOCUMENTS

| | | |
|---|---|---|
| JP | 50038700 | 4/1975 |
| JP | 06192917 | 7/1994 |
| JP | 2010143771 | 1/2010 |
| WO | 95/15564 A1 | 6/1995 |

OTHER PUBLICATIONS

Milewski, "Growth of Beta-Silicon Carbide Whiskers by the VLS Process", Journal of Materials Science 20, 1985, pp. 1160-1166.
Wikipedia entry, "Activated Carbon", http://en.wikipedia.org/wiki/Activated_carbon, Accessed Sep. 25, 2013, 15 pages.
U.S. Appl. No. 12/901,309, Apr. 16, 2013, Final Office Action.
U.S. Appl. No. 12/901,309, Apr. 2, 2012, Office Action.
U.S. Appl. No. 12/901,309, Jan. 12, 2012, Advisory Action.
U.S. Appl. No. 12/901,309, Oct. 27, 2011, Final Office Action.
U.S. Appl. No. 12/901,309, Jun. 13, 2011, Office Action.
U.S. Appl. No. 12/901,309, Apr. 20, 2011, Restriction Requirement.
Al-Olayyan, Y., et al., The Effect of Zircaloy-4 Substrate Surface Condition on the Adhesion Strength and Corrosion of SiC Coatings, Journal of Nuclear Materials, 2005, pp. 109-119, vol. 346, Elsevier B.V.
"An Innovative Ceramic Corrosion Protection System for Zircaloy Cladding," Year 3—4th Quarter Report (+6), NERI Research Project No. DE-FG03-99SF21882, Feb. 2003.

(56) References Cited

OTHER PUBLICATIONS

Bye et al., "Occurrence of airborne silicon carbide fibers during industrial production of silicon carbide," Scand J Work Environ health 11 (1985) 111-115.
Garnier, John, et al., Ex-Reactor Determination of Thermal Gap Conductance Between Uranium Dioxide and Zircaloy-4, Stage II: High Gas Pressure, Prepared for Nuclear Regulatory Commission, NUREG/CR-0330 PNL-3232, vol. 2, Jul. 1980, 78 pages.
"Hexoloy SA Silicon Carbide, Technical Data," Saint-Gobain Advanced Ceramics, 2003, 4 pages.
"Hi-Nicalon Ceramic Fiber," COI Ceramics, Inc., Jan. 2006, 2 pages.
"Hi-Nicalon Type S Ceramic Fiber," COI Ceramics, Inc., Jan. 2006, 2 pages.
"Sylramic SiC Fiber," COI Ceramics, Inc., Jan. 2006, 2 pages.
"UBE Tyranno Fibers," Engineering Ceramics, 2005, 3 pages.
PCT International Search Report and Written Opinion of the International Searching Authority for PCT/US11/55031, dated Feb. 13, 2012, 10 pages.
Morilnsen, Andrew, "Concise Encyclopedia of Composite Materials", Technology & Engineering, pp. 866-869, Dec. 8, 2003.
Belitskus, David, "Fiber and Whisker Reinforced Ceramics for Structural Application", Technology & Engineering, pp. 81-83 and 86-90, 1993.
"Silar® SiC Whiskers for Ceramic Systems", www.acm-usa.com/Pages/Materials/details.apx?fsid=0, Accessed Oct. 9, 2013, 1 pg.
Wikipedia entry, "Vapor-liquid-solid method", http://en.wikipedia.org/wiki/Vapor-Liquid-Solid<method, Accessed Oct. 9, 2013, 7 pgs.
U.S. Appl. No. 12/901,309, filed Oct. 8, 2010, titled "Methods of Producing Silicon Carbide Fibers, Silicon Carbide Fibers, and Articles Including Same," to Gamier et al.
"High-Performance Synthetic Fibers for Composites," National Materials Advisory Board, Commission on Engineering and Technical Systems, National Research Council, Publication NMAB-458, Apr. 1992, 142 pages.
Haibo et al., "Synthesis of a silicon carbide coating on carbon fibers by deposition of a layer of pyrolytic carbon and reacting it with silicon monoxide," Carbon 46 (2008) 1339-1344.
Jayaseelan et al., "In Situ Formation of Silicon Carbide Nanofibers on Cordierite Substrates," J. Am. Ceram. Soc., 90 [5] 1603-1060 (2007).
PCT International Search Report and Written Opinion of the International Searching Authority for PCT/US11/55025, dated Feb. 27, 2012, 7 pages.
"Abradable Coatings used for Gas Path Seals in Turbine Engines." *Vac Aero International, Inc.* Web. Accessed Dec. 3, 2014. http://vacaero.com/information-resources/vac-aero-news-and-training/products-news-training/633-abradable-coatings-for-gas-path-seals-in-turbine-engines.html.
Schricker, Bob, "Using Fiber Metal Abradable Seals in Aerospace Turbine Applications." *Defense Tech Briefs.* Technetics Group, EnPro Industries companies, Oct. 1, 2011. Web. Accessed Dec. 3, 2014. https://www.techneticsgroup.com/bin/AbradableSeals_AerospaceApplications.pdf.
Wilson, Scott, "Ensuring Tight Seals", *Sulzer Innotec Abradable Test Facility.* Sulzer Innotec, Feb. 2007. Web. Accessed Dec. 3, 2014. http://www.sulzer.com/en/-/media/Documents/Cross_Division/STR/2007/2007_2_23_wilson_e.pdf.
Okada et el., "Preparation of Silicon Carbide Fiber from Activated Carbon Fiber and Gaseous Silicon Monoxide", Journal of the American Ceramic Society, 77 [6], pp. 1691-1693, 1994.
Okada et el., "Preparation of Silicon Carbide Fiber from Activated Carbon Fiber and Gaseous Silicon Monoxide", Ceramic Engineering & Science Proceedings, 1995, pp. 45-54.
U.S. Appl. No. 14/570,927, filed Dec. 15, 2014, Garnier et al.
U.S. Appl. No. 14/615,685, filed Feb. 6, 2015, Garnier.
Chambers et al., "Development and Testing of PRD-66 Hot Gas Filters," DOE/ME/31214-97/C0734, Advanced Coal-Fired Power Systems '96 Review Meeting, Morgantown, West Virginia, Jul. 16-18, 1996, 8 pages.
Dacic et al., "Thermodynamics of gas phase carbothermic reduction of boron-anhydride," Journal of Alloyes and Compounds 413 (2006) 198-205.
Ryan et al., "The Conversion of Cubic to Hexagonal Silicon Carbide as a Function of Temperature and Pressure" USAF, 1967.
U.S. Appl. No. 13/178,854, filed Jul. 8, 2011 to Gamier et al., entitled "Composite Materials, Bodies and Nuclear Fuels Including Metal Oxide and Silicon Carbide and Methods of Forming Same."
U.S. Appl. No. 13/178,884, filed Jul. 8, 2011 to Gamier et al., entitled "Reactor Fuel Elements and Related Methods."
U.S. Appl. No. 13/215,967, Mar. 29, 2013, Restriction Requirement.
U.S. Appl. No. 13/215,967, Apr. 15, 2013, Office Action.
U.S. Appl. No. 12/901,309, Nov. 7, 2013, Office Action.
U.S. Appl. No. 13/215,967, Jan. 3, 2014, Final Office Action.
U.S. Appl. No. 12/901,309, Jun. 30, 2014, Office Action.
U.S. Appl. No. 12/901,309, Sep. 16, 2014, Notice of Allowance.
U.S. Appl. No. 13/215,967, Apr. 24, 2015, Office Action.
U.S. Appl. No. 13/215,967, Jul. 29, 2015, Notice of Allowance.

\* cited by examiner

CLADDING MATERIAL, TUBE INCLUDING SUCH CLADDING MATERIAL AND METHODS OF FORMING THE SAME

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

CROSS-REFERENCE TO RELATED APPLICATION

This application is related to U.S. patent application Ser. No. 12/901,309 to Garnier et al., entitled "METHODS OF PRODUCING SILICON CARBIDE FIBERS, SILICON CARBIDE FIBERS, AND ARTICLES INCLUDING SAME," assigned to the Assignee of the present application and filed on even date herewith, the disclosure of which is incorporated by reference herein in its entirety.

TECHNICAL FIELD

The invention, in various embodiments, relates generally to cladding material for use in nuclear reactors, tubes formed from such cladding material, and to methods of forming such tubes. More particularly, embodiments of the invention relate to tubes including an inner metallic material surrounded by fiber reinforced ceramic matrix composite and, optionally, an outer metallic material, that may be used as a fuel containment barrier.

BACKGROUND

Nuclear reactor fuel designs, such as pressurized water reactor and boiling water reactor fuel designs, impose significantly increased demands nuclear fuel cladding tubes. Such components are conventionally fabricated from the zirconium-based metal alloys, such as zircaloy-2 and zircaloy-4. Increased demands on such components are in the form of longer required residence times, thinner structural members and increased power output per area, which cause corrosion. Resistance to radiation damage, such as dimensional change and metal embrittlement, is one of the most important considerations in selecting cladding materials for a fuel cladding tube. Zirconium alloys are currently used as the primary cladding material for nuclear fuel in nuclear power plants because of their low capture cross-section for thermal neutrons and good mechanical and corrosion resistance properties, high thermal conductivity and high melting point.

While zirconium and other metal alloys have excellent corrosion resistance and mechanical strength in a nuclear reactor environment under normal and accident conditions where the heat fluxes are relatively low, they encounter mechanical stability problems during conditions such as a departure from nucleate boiling ("DNB") incident that might occur during accidental conditions. Any action tending to increase the heat flux of the core in order to raise the plant output will aggravate these problems. A significant in-reactor life limiting use with currently available fuel cladding tubes formed from zirconium-based alloys is corrosion, especially in the presence of water and increased operating temperatures of newer generations of nuclear reactors, such as light water reactors (LWRs) and supercritical water cooled reactors (SCWRs). For example, buildup of oxide material on the fuel cladding tubes caused by oxidation of zirconium during reactor operation may lead to adverse effects on thermal conduction. Hydrogen generated by oxidation of the zirconium in the fuel cladding tubes causes embrittlement of the zirconium and formation of precipitates in the fuel cladding tube which is under an internal gas pressure. The presence of the precipitates may reduce mechanical strength of the fuel cladding tube causing cracks in walls and end caps.

Fuel cladding tubes formed from zirconium and zirconium alloys are also susceptible to stress corrosion cracking during operation due to joint action of fission precuts and mechanical stress resulting from radiation-induced swelling of fuels. The interaction between the fuel and the cladding results in nucleation and propagation of cracks and depressurization of the fuel cladding tube. Such cracks propagate from an internal surface of the fuel cladding tube to an external surface and, thus, may rupture the cladding wall. Depressurization of the fuel cladding tube due to stress corrosion cracking significantly reduces the life of the fuel cladding tube and, in addition, reduces the output and safety of the nuclear reactor. Moreover, the fuel cladding tube may be circumferentially loaded in tension due to expansion of the contents, such as fuel pellets, within the fuel cladding tube. Deformation of the fuel cladding tube resulting from such tension increases susceptibility of the fuel cladding tube to stress corrosion failure.

Silicon carbide has also been used to form fuel cladding tubes for use in nuclear reactors. The silicon carbide fuel cladding tubes are porous structures that are difficult to achieve reliable hermetic sealed around the nuclear fuel. Thus, ceramic material debris dislodged from the silicon carbide fuel cladding tubes during use may reside between the fuel and the ceramic cladding and may be a source of local stress concentration during normal fuel swelling. The release of such ceramic material debris causes localized thermal and mechanical damage in the silicon carbide fuel cladding tubes, eventually causing failure thereof.

Given the resurgence of nuclear energy development worldwide there is a significant need today for both safety and economical performance enhancements to power plant or other reactor operations. Improved fuel cladding tubes that reduce operation costs and increase safety during reactor accidents are desirable.

BRIEF SUMMARY

In one embodiment, the present disclosure includes a cladding material. The cladding material may include a metallic material comprising at least one of zirconium, iron, nickel, chromium, molybdenum, niobium, bismuth, and alloys thereof and a ceramic matrix composite overlying the metallic material and comprising reinforcing fibers within a silicon carbide matrix. For example, the metallic material may comprises zircaloy-4.

In another embodiment, the present disclosure includes a tube having an inner metal liner and a ceramic matrix composite disposed over the inner liner. The inner liner may include at least one of zirconium, iron, nickel, chromium, molybdenum, niobium, bismuth, and alloys thereof. The ceramic matrix composite may include reinforcing fibers within a silicon carbide matrix. The reinforcing fibers may include at least one of silicon carbide, carbon and fibers thereof. The inner liner may include exposed distal ends protruding from the ceramic matrix composite, the exposed distal ends having an increased thickness. The tube may additionally include an outer liner formed from at least one of zirconium, iron, nickel, chromium, molybdenum, niobium, bismuth, and alloys thereof. The outer liner may be interconnected with the inner liner through voids or pores in the ceramic matrix composite.

In another embodiment of the present disclosure includes a method forming a tube that includes forming an inner metallic liner and forming a ceramic matrix composite over the inner metallic liner, the ceramic matrix composite comprising reinforcing fibers within a silicon carbide matrix. The inner metallic liner may be formed from at least one of zirconium, iron, nickel, chromium, molybdenum, niobium, bismuth, and alloys thereof. The ceramic matrix composite may be formed over the inner metallic liner by forming a preform comprising the reinforcing fibers over the inner metallic liner, infiltrating the preform with a pre-ceramic polymer material and heating the pre-ceramic polymer material to a first temperature to form the ceramic matrix composite. The inner metallic liner may be fused to the outer ceramic matrix through a plurality of pores formed by the weave of the fibers.

Yet another embodiment of the present disclosure includes a method forming a multi-layered tube that includes forming an elongated cylinder surrounding a hollow compartment from a ceramic matrix composite, the ceramic matrix composite comprising a reinforcing fiber within a silicon carbide matrix and forming a metallic material over surfaces of the ceramic matrix composite.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION

Embodiments of the present disclosure related to a cladding material that may be used in a containment vessel, such as a fuel tube, for nuclear fuel (i.e., fissile material), used in a nuclear power plant or other reactor or used in an industrial process. The cladding material may have a multi-layered structure including a metallic material that includes a zirconium alloy and a ceramic matrix composite (CMC) layer that includes continuous silicon carbide fibers and a matrix comprising a silicon carbide ceramic. The cladding material may be used to form a multi-layered tube that includes the metallic material as an inner liner and the ceramic matrix composite as an outer support. The multi-layered tube may be used, for example, as a fuel cladding tube for a nuclear reactor, a chemical processing heat exchanger, a steam generator, a gas phase cooling system, a radiator or a combustion chamber liner. The multi-layered tube may further include an outer metallic liner that may, optionally, be fused with the inner liner to encapsulate the ceramic matrix composite. The metallic material at the ends of the fuel tube may have a greater thickness to provide area for end cap welding of the fuel tube. The cladding material of the present disclosure provides a combination of thermal and mechanical features as a result of the combination of metallic and ceramic layers. Specifically, the metallic material provides hermetic sealing and containment of gases and fuel within a chamber of the fuel cladding tube and enables end cap sealing. The ceramic matrix composite layer imparts additional mechanical strength, stiffness, thermal shock resistance and high temperature load carrying capability to the fuel cladding tube. Thus, the presently disclosed fuel tube increases the lifetime and significantly increases safety margins as compared to conventional fuel tubes.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the invention and such term is used in preference to the more restrictive term "is" so as to avoid any implication that other, compatible materials, structures, features and methods usable in combination therewith should or must be, excluded.

As used herein, the term "ductile" means and includes materials, such as a metal or metal alloy, with sufficient strength under tension that may be stretched or elongated before fracturing.

As used herein, the term "axial" means and includes a direction substantially parallel to a defined axis of, for example, the fuel cladding tube.

As used herein, the term "radial" means and includes a direction substantially perpendicular to the central axis of, for example, the fuel cladding tube.

As used herein, the term "axial force" means and includes a force exerted in a direction substantially parallel to the defined axis, while the term "radial force," as used herein, means and includes a force exerted in a direction in a plane substantially perpendicular to the defined axis. Neither term is limited to forces exerted in directions that intersect the defined axis.

As used herein, the term "thermal expansion" means and includes dimensional changes of a solid material in response to an internal temperature increase. The terms "coefficient of thermal expansion" and "CTE," as used herein, mean and include a parameter characterizing a change in dimension of a material relative to a change in temperature. As used herein, the term "thermal expansion material" means and includes a material that expands in response to a temperature change.

As used herein, the term "hermetic" means and includes preventing undesirable ingress or egress of chemicals into or out of the multi-layered tube over the useful life of the device using a seal that is essentially impermeable to chemicals.

As used herein, the term "off-normal event" means and includes any event that may cause mechanical damage to a conventional fuel rod, devices or structures, or thermal mechanical damage caused by external fuel rod coolant loss during operation.

As used herein, the terms "seeding" and "seeded" mean and include introduction of one or more crystals or particles of a material as a seed or nucleus for crystallization.

Figure 1A:
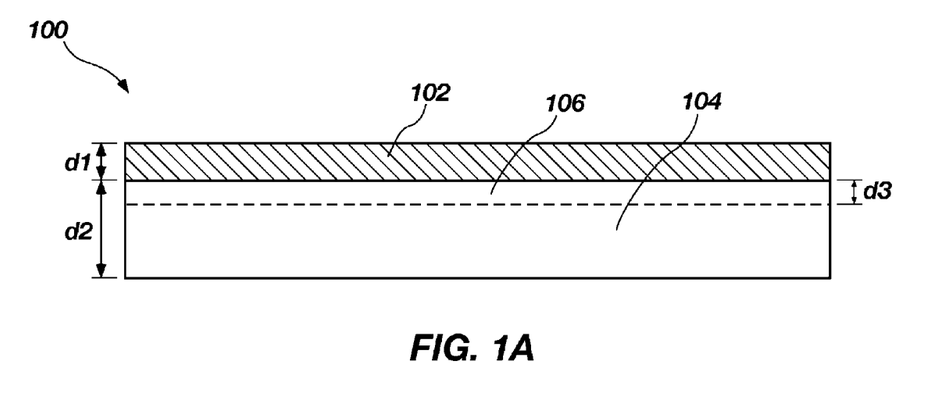
FIGS. 1A and 1B are cross-sectional views illustrating embodiments of a cladding material according to the present disclosure.

Referring to FIG. 1A, a cladding material 100 may be formed that includes a metallic material 102 and a ceramic matrix composite 104. The metallic material 102 may be formed from a monolithic material that comprises one single, unbroken unit without joints or seams and may be formed from a ductile metal or metal alloy. For example, the metallic material 102 may be formed from at least one of zirconium, iron, nickel, chromium, molybdenum, niobium, bismuth, and alloys thereof. As a non-limiting example, the metallic material 102 may be formed from a zirconium alloy, such as zircaloy-2, zircaloy-4, and other low tin zirconium-tin alloys. Zircaloy-4 includes about 98.23 wt % zirconium, about 1.45 wt % tin, about 0.21 wt % iron, about 0.1 wt % chromium, and about 0.01 wt % hafnium. Zircaloy-2 includes about 98.25 wt % zirconium, between about 1.2 wt % and about 1.7 wt % tin, between about 0.5 wt % and about 0.15 wt % chromium, between about 0.07 wt % and about 0.135 wt % iron, between about 0.03 and about 0.08 wt % nickel and 0.01 wt % hafnium. A thickness d1 of the metallic material 102 may be less than or equal to between about 0.05 mm and about 1 mm, and more particularly 0.25 mm.

The ceramic matrix composite 104 may have a thickness d2 of between about 0.25 mm and about 2.5 mm, and more particularly, about 1.27 mm. The ceramic matrix composite 104 may comprise a ceramic matrix interspersed with reinforcing fibers. As a non-limiting example, the ceramic matrix composite 104 may comprise a silicon carbide reinforced composite, examples of which are known in the art. The ceramic matrix may include, for example, a silicon carbide material, such as an amorphous or nano-crystalline beta silicon carbide material or an alpha silicon carbide material. The ceramic matrix may optionally include a metal particulate, such as zirconium, dispersed in the silicon carbide material. Other metal particulate having a high melting point and compatibility with silicon carbide, such as titanium, niobium, vanadium, hafnium, molybdenum and tantalum, may be also be used. Addition of the metal particulate to the ceramic matrix substantially increases the coefficient of thermal expansion (CTE) of the ceramic matrix composite 104 to be closer with that of the metallic material 102. For example, the ceramic matrix composite may have a CTE of about $3.4 \times 10^{-6}$ and the zirconium metal may have a CTE of about $6 \times 10^{-6}$. Adding the metal particulate to the ceramic matrix composite may, therefore, increase the CTE to between about $4.5 \times 10^{-6}$ to about $5 \times 10^{-6}$ metal. In addition, addition of the metal particulate to the ceramic matrix composite may impart oxidation resistance. Accordingly, addition of the transition metal to the ceramic matrix enables a thickness of the metallic material 102 to be increased. The reinforcing fibers may be formed from alpha or beta carbon, alpha or beta silicon carbide, silicon nitride, boron carbide and basalt. As a non-limiting example, the reinforcing fibers may include NICALON®. Type S beta ceramic fiber, which is commercially available from Nippon Carbon Company (Tokyo, Japan), Tyranno beta ceramic fiber from UBE Industries (Tokyo, Japan) or alpha silicon carbide fibers formed using methods described in, for example, in the aforementioned U.S. patent application Ser. No. 12/901,309, filed on even date herewith. As an example, the ceramic matrix composite 104 may include reinforcing fibers formed from alpha silicon carbide disposed in a matrix formed from alpha silicon carbide. As another non-limiting example, the ceramic matrix composite 104 may include reinforcing fibers formed from beta silicon carbide disposed in a matrix formed from beta silicon carbide.

In some embodiments, the metallic material 102 may be disposed over or in contact including through the wall with the ceramic matrix composite 104 without the metallic material 102 and the ceramic matrix composite 104 being physically bonded to one another. In other embodiments, the metallic material 102 and the ceramic matrix composite 104 may be bonded to one another via an intermediate material 106 at an interface between the metallic material 102 and the ceramic matrix composite 104. The intermediate material 106 may be formed by a chemical interaction between the metallic material 102 and the ceramic matrix composite 104, as will be discussed. For example, if the metallic material 102 includes a zirconium alloy and the ceramic matrix composite 104 includes silicon carbide, the intermediate material 106 may include a zirconium silicate ($Zr_xSi_y$). The intermediate material 106 may have a thickness d3 of between about 0.02 mm and about 1 mm, and more particularly about 0.02 mm. The intermediate material 106 may also function as a thermal expansion material in the cladding material 100 and may enhance thermal transport from the metallic material 102 into the ceramic matrix composite 104. The cladding material 100 may be used in a variety of high-temperature applications involving exposure to oxidative and corrosive materials. As a non-limiting example, the cladding material 100 may be used as in a chemical processing apparatus, as a reactor seal, as a fuel cladding tube, as a chemical processing heat exchanger, as a steam generator, as a gas phase cooling system, as a radiator or as a combustion chamber liner, as will be described.

Figure 1B:
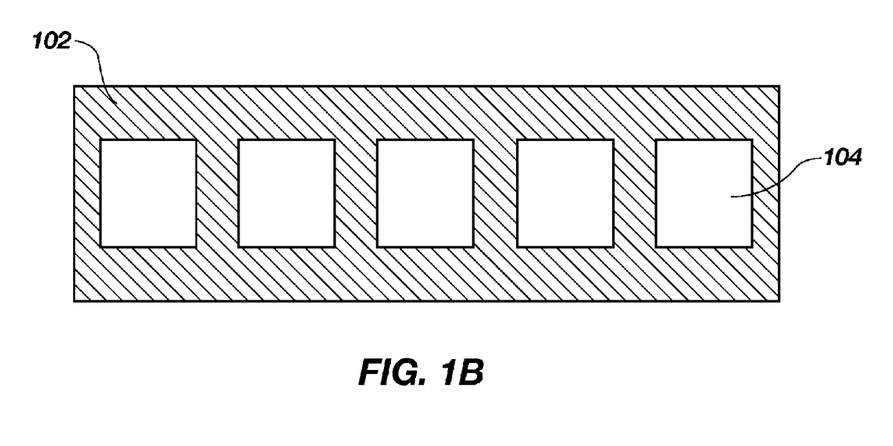

Referring to FIG. 1B, the metallic material 102 may be formed on opposite surfaces of the ceramic matrix composite 104. The metallic material 102 may infiltrate voids within the ceramic matrix composite 104 such that the ceramic matrix composite 104 is encapsulated within the metallic material 102. The additional metallic material 102 may provide increased mechanical strength and may protect the ceramic matrix composite 104 from oxidation.

Figure 2A:
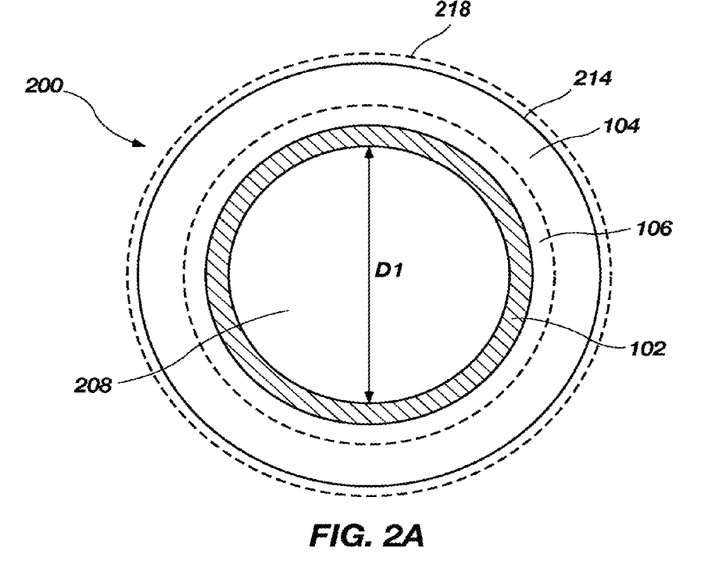
FIG. 2A is a cross-sectional front view illustrating an embodiment of a tube formed from the cladding material according to the present disclosure.
Figure 2B:
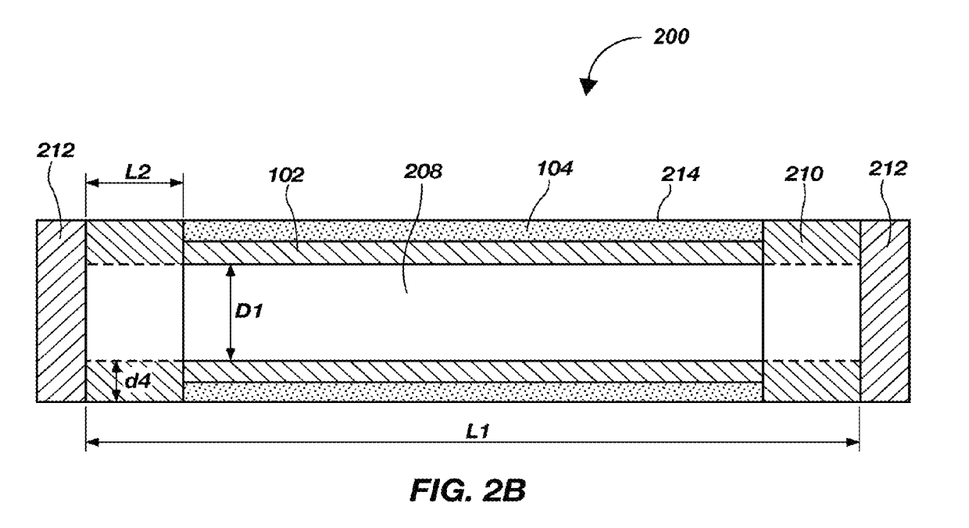
FIG. 2B is a cross-sectional side view illustrating an embodiment of the tube shown in FIG. 2A.

As shown in FIGS. 2A and 2B, a tube 200 may be formed from the cladding material 100 described with respect to FIGS. 1A-1B and may be used with a fuel rod for a reactor such as in a nuclear power plant or other power plant. The tube 200 may be used, for example, as a containment tube for one or more fuels in the reactor. For example, the tube 200 may be used to contain nuclear fuel in a variety of nuclear reactor designs, such as, light water reactors (LWR), pressurized water reactors (PWR), liquid metal fast reactors (LMFR), high temperature gas-cooled reactors (HTGR) and steam cooled reactor boiling-water reactors (SCBWR).

For simplicity, the tube 200 is shown as having an elongated cylinder shape surrounding a hollow compartment 208. The tube 200 may, however, be formed in any number of cross-sectional shapes, such as a triangular shape, a square shape, a rectangular shape or a trapezoidal shape. The tube 200 may include the ceramic matrix composite 104 overlying the metallic material 104, the metallic material 104 forming a liner over inner surfaces of the ceramic matrix composite 104. The combination of the ceramic matrix composite 104 over the metallic material 102 in the tube 200 provides advantageous properties, as will be described. For example, the tube 200 may have a substantially increased lifetime and improved safety margins in comparison to conventional zirconium fuel tubes and conventional silicon carbide fuel tubes. The ability to maintain strength and structure during an off-normal event results in an increased margin between where the fuel would fail and where it can operate even in an accident. The increased margin makes for an inherently safer fuel. The safety margin could be traded for a greater operating flexibility while maintaining adequate safety margins.

The metallic material 102 may encompass the compartment 208, which is sized and configured to house the fuel. For example, the fuel tube 200 may have an outer diameter D1 of from about 7 mm to about 12 mm and, more particularly, about 9.5 mm. The ceramic matrix composite 104 may provide mechanical support for the metallic material 102 as well as mechanical strength in the axial and radial directions and protection from environmental elements, such high temperatures, oxidation and hydrating. The tube 200 may be exposed to high temperatures from heater water and in an off-normal event super heated water which will dissociate into oxidizing and hydrating elements.

The ceramic matrix composite 104 and the metallic material 102 may be bonded to one another by an intermediate material 106, as described with respect to FIG. 1A. For example, the ceramic matrix composite 104 may comprise silicon carbide, the metallic material 102 may comprise a zirconium alloy, and the intermediate material 106 at the interface of the ceramic matrix composite 104 and the metallic material 102 may comprise a zirconium silicate material. The zirconium silicate material may be formed, for example, by a reaction between silicon in the ceramic matrix composite 104 and zirconium in the metallic material 102, as will be described.

During off-normal events the metallic material 102 may react fully with dissociated oxygen to form a brittle non-supportive ceramic zirconium dioxide material. The ceramic matrix composite 104 is substantially non-reactive with the dissociated oxygen and, thus, retains strength and stability for containing fissile materials. The non-exothermic reaction of silicon carbide with oxygen may form a passivating material comprising silicon dioxide ($SiO_2$) that inhibits further reaction with the underlying silicon carbide. Metallic elements such as zirconium, niobium, hafnium, tantalum and tungsten or carbides thereof may be added to the matrix to enhance temperature resistance to oxidation. Table 1 provides examples of particles that may be added to a ceramic matrix comprising silicon carbide to increase resistance of the ceramic matrix composite 104 to oxidation at increased temperatures.

purpose of providing a sufficiently thick metallic region for welding of end caps 212 to contain the nuclear fuel and starting helium and fission by-product gases generated during fuel operation (not shown), The thickened regions 210 may have a substantially increased wall thickness d4 of between about 0.4 mm to about 1.2 mm and, more particularly, between about 0.5 mm to about 1 mm. As a non-limiting example, a length L2 of the thickened regions 210 may be between about 0.5 mm and about 1.5 mm. The thickened regions 210 may provide increased surface area and material for sealing the ends of the tube 200 by, for example, attaching the thickened regions 210 at each of the ends to an end cap 212. The end cap 212 may include any metal, metal alloy or other material suitable for attachment to the thickened regions 210 using a conventional process, such as a welding process. For example, the end caps 212 and the thickened regions 210 may each comprise a zirconium alloy, such as zircaloy-4, and the ends of the tube 200 may be sealed by attaching the ends caps 212 to the thickened regions 210 using a conventional welding process or other process. The thickened regions 210 of the metallic material 102, therefore, enable hermetic sealing of the tube 200 containing nuclear fuel and pressurized starting life gas (helium) and fission gas products formed during the useful life of the fuel.

The ceramic matrix composite 104 may include reinforcing fibers within a ceramic matrix. The reinforcing fibers may be in the form of a continuous fiber or may be woven or otherwise interlaced to form a multi-axial fabric. The form (i.e., woven using continuous fiber) of the reinforcing fibers of the ceramic matrix composite 104 may be selected to provide both axial and radial strength tailored to a specific nuclear reactor or a location within the nuclear reactor. For example, the reinforcing fibers may be provided as a woven structure, such as an open or closed tri-axial weave, a harness satin weave or an three dimensional X, Y, Z weave, in which the reinforcing fibers are interlaced with one another to tailor the reinforcing fibers of the ceramic composite for thermal expansion, modulus, conductivity and drapability. The reinforcing fibers having a tri-axial weave include axial and radial fibers and, thus, may provide substantially increased stiffness

TABLE 1

| Material | CTE (10-6 K-1) | CTE Change with Material addition to SiC | Melting Temp (° C.) | Density (gm/cc) | Structure | Thermal Neutron Adsorbing Behavior | Silicate Glass formed with SiC in presence of oxygen | Upper Temp Range (° C.) |
|---|---|---|---|---|---|---|---|---|
| TiB2 | 7 | increase | 3,140 | 4.93 | Hexagonal | medium to high | Titania borosilicate | 1,600 |
| ZrC | 6.7 | increase | 3,532 | 6.73 | cubic | low | Zirconia silicate | 2,100 |
| NbC | 6.6 | increase | 3,500 | 7.8 | cubic | low | Niobium silicate | 2,100 |
| B4C | 1.7 | decrease | 2,973 | 3.48 | alpha-rhombohedral | high | Borosilicate | 1,400 |
| SiC | 2.4 | no change | 2,730 | 3.21 | beta - cubic alpha-hexagonal | low | Silicate ($SiO_2$) | 2,000 |
| HfC | 7.3 | increase | 3,890 | 12.2 | cubic | low | Hafnium silicate | 2,300 |
| TiC | 5.5 | increase | 4,820 | 4.93 | cubic | medium | Titanium silicate | 1,800 |
| TaC | 6.4 | increase | 3,880 | 13.9 | cubic | medium | Tantalum silicate | 2,400 |
| WC | 5.5 | increase | 2,870 | 15.8 | hexagonal | medium | Tungsten silicate | 2,400 |

As shown in FIG. 2B, the tube 200 may have a length L1 of from about 0.3 m to about 4 m, and more particularly, about 3.6576 m (i.e., 3657.6 mm). The metallic material 102 may include thickened regions 210 extending beyond the ceramic matrix composite 104 at distal ends of the tube 200 for the and mechanical and thermal load capacity when incorporated into the ceramic matrix composite 104 of the tube 200. As a non limiting example, the reinforcing fibers may be formed from silicon carbide ceramic fibers having a tri-axial weave, and a volume fraction of the reinforcing fibers in the ceramic matrix composite 104 may be between about 30% and about 45%. Variations in axial and radial orientation of the reinforcing fibers within the ceramic matrix composite 104 may result from changes in braid angle (e.g., between about 30 and about 60 degrees) of the reinforcing fibers, a percentage of the reinforcing fibers oriented in the axial direction (e.g., between about 20% and about 40%) and percentage of reinforcing fibers oriented in the radial directions (e.g., between about 40% and about 80%).

A fiber denier (i.e., tow count or filament size) of the reinforcing fibers within the ceramic matrix composite 104 may be selected to tailor a texture of an outer surface 214 of the ceramic matrix composite 104. For example, the fiber denier of the reinforcing fibers may be reduced so that the outer surface 214 of the ceramic matrix composite 104 is finer and less textured (i.e., exhibits increased smoothness).

The difference between a coefficient of thermal expansion of the ceramic matrix composite 104 and the metallic material 102 provide a substantial reduction in overall thermally induced stresses. As the tube 200 is exposed to increased temperatures, the metallic material 102 may expand forcing the metallic material 102 into compression. In addition, the metallic material 102 may expand in a radial direction as the tube 200 is exposed to increased temperatures placing the ceramic matrix composite 104 into radial tension. The radial tension on the ceramic matrix composite 104 may relieve tensile stresses on the metallic material 102. The radial tension of the ceramic matrix composite 104 may be substantially similar or equal to a net internal gas pressure within the tube 200 (e.g., 2,000 psi (13790 kPa) to 3,000 psi (20685 kPa)), and may be well below a pressure at which the ceramic matrix composite 104 may yield leading to failure. Since the compressive stresses on the metallic material 102 are substantially reduced by the ceramic matrix composite 104, the tube 200 exhibits increased resistance to cracking and provides a substantially increased lifetime in comparison to conventional fuel cladding tubes.

The ceramic matrix composite 104 may, optionally, include at least one oxygen inhibitor, such as an oxygen getter and/or a glass former. Examples of suitable oxygen inhibitors are shown in Table 2. For example, at least one of a glass forming metallic species including at least one of calcium (Ca), ytterbium (Y), zirconium (Zr), and tantalum (Ta) may be included in the ceramic matrix of the ceramic matrix composite 104.

TABLE 2

| Oxygen Inhibitors | Material Types as added to the SiC Matrix | Material Form |
|---|---|---|
| Oxygen Getters $M(s) + O_2(g) \rightarrow MO_2(g)$ | Silicon (Si), Zirconium (Zr), Molybdenum (Mo), Titanium (Ti), Tantalum (Ta), Niobium (Nb), Yttrium (Y), Tungsten (W) | powder (micron) |
| Glass formers $2MC(s) + 3O_2(g) \rightarrow 2MO_2(solid) + 2CO(g)$ | Silicon (Si), Silicon carbide (SiC), Zirconium carbide (ZrC), Tantalum carbide (TaC), Titanium carbide (TiC), Tungsten carbide (WC) | powder (micron) |
| Getter + Glass: Metallic Silicates $M_xSi_y(s) + O_2(g) \rightarrow M_xSi_yO_2(s)$ | Zirconium silicate (ZrSi3, ZrSi2), Titanium silicate (Ti5Si3), Titanium silicate (TiSi) | powder (micron) |

In embodiments in which the metallic material 102 includes zirconium or a zirconium alloy and the ceramic matrix composite 104 includes silicon carbide, the oxygen inhibitor may include, for example, silicon powder, silicon carbide powder, zirconium powder or a zirconium silicate.

For non-nuclear applications, boron carbide ($B_4C$) powder may be added to a ceramic matrix composite 104 comprising silicon. In embodiments in which the reinforcing fibers of the ceramic matrix composite 104 comprise silicon carbide coated carbon fibers, boron oxide ($B_2O_3$) may be added to the silicon carbide matrix to wet the carbon. Oxygen released by dissociation of water may contact the ceramic material (i.e., silicon carbide) causing oxidation of the ceramic matrix followed by oxidation of the ceramic fibers. The glass forming metallic species may act as an oxygen getter by trapping and/or chemisorbing the oxygen also the metallic species can function to increase the viscosity of the now formed silicon dioxide ($SiO_2$) at elevated temperatures to provide further increased oxidation resistance and longer high temperature utility. The glass forming species may also react with metal particulates or additives in the ceramic matrix composite 104 or other metals, such as the metallic material 102. For example, zirconium dioxide ($ZrO_2$) may be formed from zirconium and, in turn, the combination of the zirconium dioxide and the silicon dioxide may form zircon ($ZrSiO_4$), which is a stable glass with a melting point of about 2750° C. (about 4980° F.). Other compounds that act as glass formers with silicon dioxide include, but are not limited to, tungsten oxide ($WO_2$), which has a melting point of about 2870° C. (about 5200° F.) and tantalum pentoxide ($Ta_2O_5$), which has a melting point of about 2996° C. (about 5425° F.). The increased viscosity of the silicon dioxide in the ceramic matrix also reduces oxygen transport through the ceramic matrix to the metallic material 102.

The ceramic matrix composite 104 of the tube 200 may further provide a substantially reduced rate of material oxidation in comparison to conventional fuel cladding tubes. During later stages of an off-normal event, the tube 200 may be heated to temperatures in excess of about 800° C. (about 1475° F.) and, more particularly, between about 900° C. (about 1650° F.) and about 1200° C. (about 2200° F.), causing water used as a coolant in the reactor to dissociate on contact with the outer fuel rod and into hydrogen and oxygen ($H_2O \rightarrow H_2+O$). The oxygen may directly react in an exothermic manner with the metal of the metallic material 102 leading to surface temperatures of greater than about 1650° C. (about 3000° F.). The metallic material 102 may lose much of its strength at temperatures greater than about 537.8° C. (about 1000° F.), thus, compromising the mechanical strength of the tube 200. At temperatures of greater than about 815.6° C. (1500° F.), the metallic material 102 may exothermically react with the oxygen formed by dissociation of the water. For example, the metallic material 102 may comprises a zirconium alloy and the zirconium may reaction with the oxygen to form crystalline zirconium oxide (e.g., $Zr+2O \rightarrow ZrO_2$) on a surface of the metallic material 102. Because the zirconium oxide reaction product does not adhere to the metallic material 102, cracks may form in ceramic matrix composite 104 of the tube 200 that enable additional oxygen ingress leading to breaching of the tube 200.

For example, the ceramic matrix composite 104 may comprise silicon carbide and the metallic material 102 may comprise zircaloy-4. As the tube 200 is exposed to increased temperatures, the silicon carbide of the ceramic matrix composite 104 may react with oxygen resulting in formation of an adherent amorphous glass material comprising silicon dioxide (e.g., $2SiC+3O_2 \rightarrow 2SiO_2$ (glass)+2CO (gas)) on surfaces of the ceramic matrix composite 104. The presence of the amorphous glass material on the ceramic matrix composite 104 may substantially reduce or eliminate the ingress of oxygen such that oxygen enters the tube 200 only by way of diffusion through the amorphous glass material. In addition, the reaction of the silicon carbide of the ceramic matrix composite 104 with the oxygen inherently consumes additional undesired oxygen from the tube 200. Accordingly, an amount of the oxygen available for reaction with the metal (i.e., zirconium) of the metallic material 102 is substantially reduced by the ceramic matrix composite 104. Thus, the presence of the ceramic matrix composite 104 overlying the metallic material 102 of the tube 200 provides a significantly increased lifetime and improved safety margins in comparison to conventional zirconium metal multi-layered tubes.

Additional embodiments of the invention include methods of forming cladding material, such as the tube 200 shown in FIGS. 2A and 2B. In some embodiments, the metallic material 102 may be formed before forming the ceramic matrix composite 104 and the ceramic matrix composite 104 may be formed around the metallic material 102. In such an embodiment, a portion of the metallic material 102 and the ceramic matrix composite 104 may react to form the intermediate material 106, as will be described.

Figure 3:
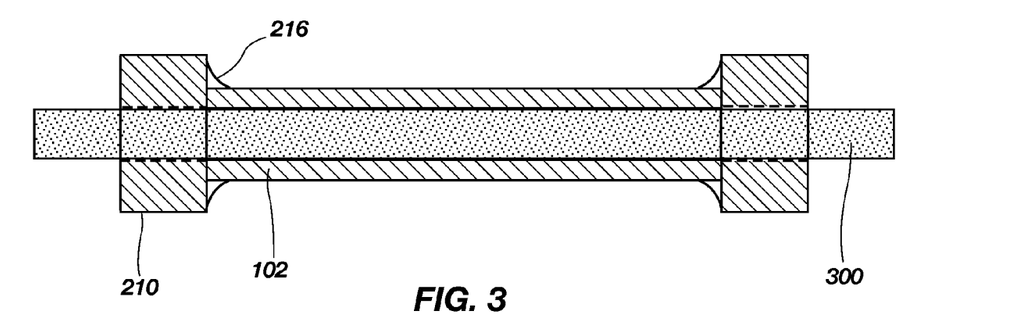
FIG. 3 is a cross-sectional side view illustrating an embodiment of a portion of the tube during processing.

For example, the metallic material 102 may be formed using a conventional process, such as a machining process, a molding process or an extrusion process. FIG. 3 illustrates an embodiment of a method of forming the metallic material 102. A metallic tube with walls having at least the thickness d4 of the thickened regions 210 may be mounted on a support structure 300, such as a solid metal rod (e.g., an aluminum rod or a brass rod). As a non-limiting example, the metallic tube may be immobilized on the support structure 300 using an adhesive material (not shown), such as a wax. Material may be removed from proximal regions of an outer wall of the metallic tube until the thickness d1 of the metallic material 102 is achieved. In some embodiments, the material may be removed from the metallic tube using a conventional machining process performed with a mandrel. A relief polish may be performed such that a transition 216 between a thinned portion of the metallic material 102 and the thickened regions 210 is beveled and substantially free of burrs. The support structure 300 provides structural support for the metallic material 102 during the machining process and handling of the metallic liner after processing. In embodiments in which the wax is used as the adhesive material, the metallic material 102 may be released from the support structure 300 by heating the wax to a temperature sufficient to at least partially melt the wax.

The ceramic matrix composite 104 may be formed using a conventional liquid phase infiltration process such as, a polymer infiltration and pyrolysis process (PIP), a slurry infiltration process (SIP), and a reactive metal infiltration (RMI) process. In some embodiments, the ceramic matrix composite 104 may be formed around the metallic material 102 by forming a fiber preform from the reinforcing fibers and disposing the fiber preform over a circumference of the metallic material 102. As previously discussed, the reinforcing fibers may comprise beta silicon carbide fibers, types of which are known in the art and are commercially available, or alpha silicon carbide fibers formed using methods described in, for example, in the aforementioned U.S. patent application Ser. No. 12/901,309.

The reinforcing fibers of the fiber preform may be infiltrated with a pre-ceramic polymer and silicon to form a precursor structure. Examples of pre-ceramic polymers include, but are not limited to, allyhydridopolycarbosilane (AHPCS), CERASET® polysilazane and polyureasilazane ceramic precursor resins (commercially available from Kion Corporation a Clariant Corporation, Charlotte, N.C.), and STARFIRE® SMP-10 polycarbosilane/siloxane silicon carbide precursor polymer (commercially available from Starfire Systems, Inc., Schenectady, N.Y.). Optionally, a silicon powder may be mixed with the pre-ceramic polymer. The pre-ceramic polymer may be cured to form the precursor structure by exposing the pre-ceramic polymer to a temperature of about 200° C. (about 400° F.). In some embodiments, the fiber preform may be infiltrated with the pre-ceramic polymer to form a precursor structure and the precursor structure may be disposed over or molded around the circumference of metallic material 102.

The metallic material 102 may, optionally, be bonded to the ceramic matrix material of the ceramic matrix composite 104 by exposing the precursor structure to a temperature sufficient to initiate a chemical reaction between the material of the metallic material 102 and the pre-ceramic polymer. The chemical reaction may result in formation of the intermediate material 106 bonding the metallic material 102 to the ceramic matrix composite 104. For example, the metallic material 102 may be formed from zircaloy-4 and the pre-ceramic polymer may be formed from CERASET® polysilazane 20 ceramic precursor resin and precursor structure may, optionally, be heated to a temperature of about 1420° C. (about 2590° F.) to form a zirconium silicate material. As the zirconium silicate forms, it acts as a barrier to the silicon, slowing diffusion of the silicon into the zircaloy-4 and the reaction between the silicon and zirconium. Thus, the thickness d3 of the zirconium silicate material may be dependent on an amount of free silicon in the pre-ceramic polymer available to react with the zircaloy-4 material.

For example, the ceramic matrix composite 104 may be formed by depositing the preform over the metallic material 102 or, if present, the intermediate material 106 and exposing the pre-ceramic polymer to a temperature sufficient to obtain the ceramic matrix material. As a non-limiting example, the pre-ceramic polymer may be formed from CERASET® polysilazane 20 ceramic precursor resin. The pre-ceramic polymer may additionally include particles of beta silicon carbide (e.g., beta silicon carbide powder), or the pre-ceramic polymer may be seeded with particles of alpha silicon carbide (e.g., alpha silicon carbide powder). In embodiments in which the reinforcing fibers comprise beta silicon carbide, beta silicon carbide powder may be added to the pre-ceramic polymer. In embodiments in which the reinforcing fibers include alpha silicon carbide, the pre-ceramic polymer may be seeded with particles of silicon carbide. The pre-ceramic polymer may, optionally, be cured by exposing the pre-ceramic polymer to a temperature of about 200° C. (about 400° F.).

The pre-ceramic polymer may be exposed to a temperature sufficient to convert the pre-ceramic polymer to the ceramic matrix material in the presence of an inert gas (i.e., argon, nitrogen, neon, xenon, etc.) to form the ceramic matrix composite 104. The pre-ceramic polymer may be exposed to a temperature of less than a crystallization temperature thereof to form an amorphous silicon carbide. For example, the pre-ceramic material may include amorphous beta silicon carbide, and the ceramic matrix composite 104 may be formed by exposing the cured pre-ceramic polymer to a temperature of between about 600° C. (about 1110° F.) and about 1200° C. (about 2200° F.) in the inert gas. The ceramic matrix composite 104 may be re-infiltrated with the pre-ceramic polymer and heated as previously described, any number of times to form additional ceramic material and increase a density of the ceramic matrix material. Heating the ceramic matrix composite to a temperature between about 1550° C. (about 2820° F.) and about 1600° C. (about 2910° F.) will form the silicon carbide in the crystalline beta phase. To form the silicon carbide in the crystalline alpha phase ("alpha silicon carbide") when using alpha silicon carbide fibers, the pre-ceramic polymer may be seeded with particles of alpha silicon carbide (e.g., alpha silicon carbide powder) to provide nucleation sites for formation at desired locations of the alpha silicon carbide. The pre-ceramic polymer and the particles of alpha silicon carbide may be heated to a temperature at which formation of the alpha silicon carbide is thermodynamically favored, such as a temperature from about 600° C. (about 2910° F.) to about 750° C. (about 3180° F.) to form the alpha silicon carbide matrix of the ceramic matrix composite 104.

After forming the ceramic matrix composite 104, a crystallization cycle may optionally be performed to crystallize the ceramic matrix material. For example, the ceramic matrix material may comprise beta silicon carbide and may be exposed to a temperature less than or equal to about 1650° C. (about 3000° F.) to crystallize the ceramic matrix material of the ceramic matrix composite 104. In embodiments where the matrix material of the ceramic matrix composite 104 is bonded to the metallic material 102, the zirconium dioxide may react with zirconium oxide to form $Zr_5Si_4$.

In other embodiments, the ceramic matrix composite 104 may be formed using the methods previously described and, thereafter, the metallic material 102 may be formed on inner walls of the ceramic matrix composite. The metallic material 102 may be deposited using conventional metal deposition techniques, such as sputtering, or by applying molten metal to the inner surfaces of the ceramic matrix composite 104.

The tube 200 may be sealed by fusing the thickened regions 210 to one of the end caps 212 using a conventional welding process. Sealing the thickened regions 210 of the tube 200 substantially reduces or eliminates permeation of gases through the tube 200.

In some embodiments, a coating 218 may be formed over the ceramic matrix material 104 to provide a smooth outer surface to the tube 200. For example, to form the coating 218 a final pre-ceramic polymer material may be applied to outer surfaces of the tube 200 and may then be converted to beta or alpha silicon carbide using processes previously described.

Figure 4:
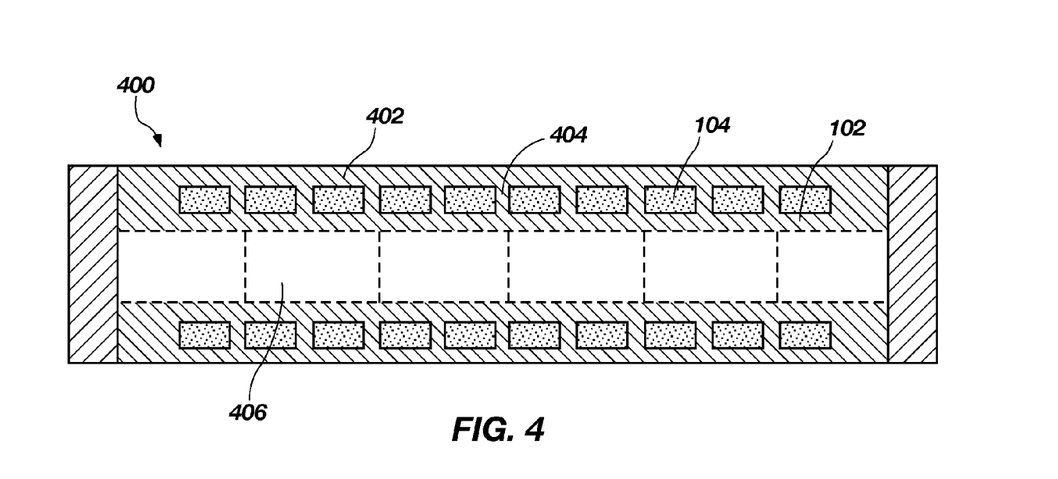
FIG. 4 is a cross-sectional side view illustrating another embodiment of a tube formed from the cladding material according to the present disclosure.

FIG. 4 illustrates another embodiment of a tube 400 that may be formed from the cladding material 100 described with respect to FIGS. 1A-1B. The tube 400 may, however, be formed in any of a number of cross-sectional shapes, such as, a triangular shape, a square shape, a rectangular shape or a trapezoidal shape. The tube 400 may additionally include an outer metallic material 402 formed from at least one of zirconium, iron, nickel, chromium, molybdenum, niobium, bismuth, and alloys thereof. The ceramic matrix composite 104 may include a plurality of voids, such as pores or holes 404, each of which provides a channel in which the inner metallic material 102 and outer metallic material 402 may be co joined or fused, as will be described. The tube 400, therefore, includes inner and outer metallic materials 102 and 402 bonded to one another through ceramic matrix composite 104. The ceramic matrix composite 104 may be contained internally within the bonded inner and outer metallic materials 102 and 402. The ceramic matrix composite carries the mechanical loads and is located along the fuel rod length where fuel pellets reside. The tube 400 enables fissile materials, such as fuel pellets 406, to be hermetically sealed therein and provides substantially increased mechanical support under normal and off-normal conditions. In addition, since the ceramic matrix composite 104 is encapsulated within the metallic material of the inner and outer liners 102 and 402, ceramic material debris that may be dislodged from the silicon carbide composite is prevented from entering the fuel-clad gap or being displaced into the external coolant, thus providing enhanced through wall thermal conductance.

In some embodiments, the inner metallic, material 102 may be pre-fabricated and may be fused to the ceramic matrix composite 104 prior to forming the outer metallic liner 402 over the ceramic matrix composite 104 using the methods previously described. In such an embodiment, the outer metallic liner 402 may be formed by applying a metallic material to the ceramic matrix composite 104 in a molten state such that the molten metallic material infiltrates the holes 404, contacting and bonding with the inner metallic material 102. Alternatively, the metallic material of the outer metallic liner 402 may be disposed about the ceramic matrix composite, for example, in the form of a sheet (not shown), and the tube 400 may be heated such that the inner and outer metallic materials 102 and 402 melt, filling the holes 404 therebetween. In other embodiments, the ceramic matrix composite 104 may be formed over a temporary tool to maintain a shape of an inner diameter of the tube 400 using the methods previously described to form a stand alone, partially infiltrated ceramic matrix composite 104. In such an embodiment, the inner and outer metallic materials 102 and 402 may be formed over the ceramic matrix composite 104 by applying a molten metallic material to the ceramic matrix composite 104 such that the metallic material is deposited on inner and outer surfaces of the ceramic matrix composite 104 and infiltrates the holes 404 therein.

The tubes 200 and 400 each provide thermal and mechanical features that uniquely result from the combination of the metallic material 102 and the ceramic matrix composite 104. The metallic material 102 enables hermetic sealing and, thus, containment of gases and fuel within the tubes 200 and 400, and provide for conventional end cap sealing. The fiber-reinforced ceramic matrix composite 104 imparts additional mechanical strength, stiffness, thermal shock resistance and high temperature load carrying capability exceeding these properties of the metallic material 102 alone.

The tubes 200 and 400 may provide substantially increased operational lifetime and improved safety margins in comparisons to conventional fuel cladding tubes, thus reducing nuclear power plant capital and operating costs.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the scope of the invention as defined by the following appended claims and their legal equivalents.

What is claimed is:

1. A cladding material comprising:
a metallic material selected from the group consisting of zirconium, iron, nickel, chromium, molybdenum, niobium, bismuth, and alloys thereof; and
a ceramic matrix composite comprising reinforcing fibers within a silicon carbide matrix, the metallic material being disposed over the ceramic matrix composite, wherein the reinforcing fibers are selected from the group consisting of carbon, silicon carbide, silicon nitride, boron carbide, basalt, and combinations thereof, the ceramic matrix composite providing increased stiffness to the cladding material;
wherein the entire ceramic matrix is interspersed with the reinforcing fibers.

2. The cladding material of claim 1, wherein the metallic material comprises zircaloy-4.

3. The cladding material of claim 1, wherein a thickness of the metallic material is less than a thickness of the ceramic matrix composite.

4. The cladding material of claim 3, wherein the thickness of the metallic material is less than or equal to about 1 mm.

5. The cladding material of claim 1, wherein the reinforcing fibers are selected from the group consisting of alpha silicon carbide, beta silicon carbide, silicon nitride, boron carbide, and basalt, and combinations thereof.

6. The cladding material of claim 1, wherein the metallic material and the ceramic matrix composite are configured as an elongated cylinder having a hollow core.

7. The cladding material of claim 1, further comprising a zirconium silicate material at an interface between the metallic material and the ceramic matrix composite.

8. The cladding material of claim 1, wherein the metallic material is disposed on opposite surfaces of the ceramic matrix composite and infiltrates voids within the ceramic matrix composite, encapsulating the ceramic matrix composite therein.

9. A cladding material comprising:
a metallic material comprising zirconium; and
a ceramic matrix composite comprising continuous reinforcing fibers within a silicon carbide matrix, the metallic material being disposed over the ceramic matrix composite;
a zirconium silicate intermediate material disposed between the metallic material and the ceramic matrix composite, the intermediate material bonding the metallic material to the ceramic matrix composite.

10. The cladding material of claim 9, wherein the continuous reinforcing fibers comprise continuous silicon carbide fibers.

11. The cladding material of claim 1, wherein the ceramic matrix composite further comprises metal particulates or metal carbide particulates dispersed in the silicon carbide matrix.

12. The cladding material of claim 1, wherein the reinforcing fibers are beta silicon carbide and the silicon carbide matrix within which the fibers are dispersed is also beta silicon carbide.

13. The cladding material of claim 1, wherein the reinforcing fibers are alpha silicon carbide and the silicon carbide matrix within which the fibers are dispersed is also alpha silicon carbide.

14. The cladding material of claim 1, wherein the reinforcing fibers are woven or otherwise interlaced with one another to form a multi-axial fabric.

15. The cladding material of claim 1, wherein the reinforcing fibers comprise from about 30% to about 45% of the ceramic matrix composite by volume.

16. A cladding material comprising:
a metallic material selected from the group consisting of zirconium, iron, nickel, chromium, molybdenum, niobium, bismuth, and alloys thereof; and
a ceramic matrix composite comprising reinforcing fibers within a silicon carbide matrix, the metallic material being disposed over the ceramic matrix composite, wherein the reinforcing fibers are selected from the group consisting of carbon, silicon carbide, silicon nitride, boron carbide, basalt, and combinations thereof, the ceramic matrix composite providing increased stiffness to the cladding material;
wherein the ceramic matrix composite further comprises metal particulates or metal carbide particulates dispersed in the silicon carbide matrix.

17. The cladding material of claim 16, wherein the reinforcing fibers are selected from the group consisting of alpha silicon carbide, beta silicon carbide, silicon nitride, boron carbide, basalt, and combinations thereof.

18. The cladding material of claim 1, wherein: (a) the reinforcing fibers are beta silicon carbide and the silicon carbide matrix within which the fibers are dispersed is also beta silicon carbide; or (b) the reinforcing fibers are alpha silicon carbide and the silicon carbide matrix within which the fibers are dispersed is also alpha silicon carbide.

* * * * *

UNITED STATES PATENT AND TRADEMARK OFFICE
CERTIFICATE OF CORRECTION

PATENT NO.        : 9,275,762 B2
APPLICATION NO.   : 12/901326
DATED             : March 1, 2016
INVENTOR(S)       : Garnier et al.

It is certified that error appears in the above-identified patent and that said Letters Patent is hereby corrected as shown below:

Title Page
Item (57), Abstract, Line 4, change "sealing of thereof" to --sealing thereof--

Specification
Column 1
Line 39, change "increased demands nuclear fuel" to --increased demands on nuclear fuel--

Column 2
Line 30, change "achieve reliable hermetic sealed" to --achieve a reliable hermetic seal--
Line 53-54, change "may comprises" to --may comprise--

Column 3
Line 4, change "In another embodiment" to --Another embodiment--

Column 5
Line 42, change "3.4.times.10.sup.-6" to --$3.4 \times 10^{-6}$--
Line 43, change "6.times.10.sup.-6" to --$6 \times 10^{-6}$--
Line 45, change "4.5.times.10.sup.-6" to --$4.5 \times 10^{-6}$--
Line 46, change "5.times.10.sup.-6" to --$5 \times 10^{-6}$--

Column 6
Line 54, change "material 104, the metallic material 104" to --material 102, the metallic material 102--

Column 7
Line 3, change "have an outer diameter" to --have an inner diameter--

Column 8
Line 4, change "(not shown), The" to --(not shown). The--

Signed and Sealed this
Fifth Day of July, 2016

Michelle K. Lee
*Director of the United States Patent and Trademark Office*

Column 10
Line 49, change "may reaction with" to --may react with--

Column 12
Line 44, change "of silicon carbide" to --of alpha silicon carbide powder--

Column 13
Line 7, change "about 600° C" to --about 1600° C--
Line 8, change "about 750° C" to --about 1750° C--
Line 50, change "co joined" to --co-joined--

Column 14
Line 1, change "inner metallic, material" to --inner metallic material--